United States Patent [19]
Jaggar

[11] Patent Number: 5,740,461
[45] Date of Patent: Apr. 14, 1998

[54] DATA PROCESSING WITH MULTIPLE INSTRUCTION SETS

[75] Inventor: David Vivian Jaggar, Cherry Hinton, United Kingdom

[73] Assignee: Advanced RISC Machines Limited, Cambridge, United Kingdom

[21] Appl. No.: 735,046

[22] Filed: Oct. 22, 1996

Related U.S. Application Data

[63] Continuation of Ser. No. 308,836, Sep. 19, 1994, abandoned.

[30]    Foreign Application Priority Data

May 3, 1994  [GB]  United Kingdom .................. 9408765

[51] Int. Cl.⁶ .................................................. G06F 9/30
[52] U.S. Cl. ........................... 395/800; 395/385; 395/570
[58] Field of Search ............................. 395/800, 385, 395/583, 570; 364/191, 180

[56]           References Cited
              U.S. PATENT DOCUMENTS

| | | | |
|---|---|---|---|
| 4,274,138 | 6/1981 | Shimokawa | 364/200 |
| 4,338,663 | 7/1982 | Strecker et al. | 395/375 |
| 4,876,639 | 10/1989 | Mensch, Jr. | 395/375 |
| 5,327,566 | 7/1994 | Forsyth | 395/775 |
| 5,404,472 | 4/1995 | Kurosawa et al. | 395/375 |
| 5,420,992 | 5/1995 | Killian et al. | 395/375 |
| 5,481,684 | 1/1996 | Richter et al. | 395/375 |
| 5,481,693 | 1/1996 | Blomgren et al. | 395/566 |
| 5,574,928 | 11/1996 | White et al. | 395/800 |
| 5,598,546 | 1/1997 | Blomgren | 395/385 |

FOREIGN PATENT DOCUMENTS

| | | | |
|---|---|---|---|
| 0 306 920 | 3/1989 | European Pat. Off. | G06F 9/30 |
| 0 324 308 | 7/1989 | European Pat. Off. | G06F 9/30 |
| 2 016 755 | 9/1979 | United Kingdom | G06F 9/00 |

*Primary Examiner*—Mehmet B. Geckil
*Attorney, Agent, or Firm*—Albert C. Smith; Fenwick & West LLP

[57]                ABSTRACT

A data processing system is described utilising two instruction sets. Both instruction sets control processing using full N-bit data pathways within a processor core 2. One instruction set is a 32-bit instruction set and the other is a 16-bit instruction set. Both instruction sets are permanently installed and have associated instruction decoding hardware 30, 36, 38.

15 Claims, 9 Drawing Sheets

| 31 | 28 27 26 25 24 23 22 21 20 | 19 | 16 15 | 12 11 | 8 7 | 5 4 3 | 0 |
|---|---|---|---|---|---|---|---|
| Cond | 00 1 OpCode S | Rn | Rd | Operand2 | | | |
| Cond | 000000 A S | Rd | Rn | Rs | 1001 | Rm | |
| Cond | 00010 B 00 | Rn | Rd | 0000 | 1001 | Rm | |
| Cond | 01 I P U B W L | Rn | Rd | Offset | | | |
| Cond | 011 | xxxxxxxxxxxxxxxxxxxx | | | 1 | xxxx | |
| Cond | 100 P U S W L | Rn | Register List | | | | |
| Cond | 101 L | Offset | | | | | |
| Cond | 110 P U N W L | Rn | CRd | CP# | Offset | | |
| Cond | 1110 CP Opc | CRn | CRd | CP# | CP | 0 | CRm |
| Cond | 1110 CP Opc L | CRn | Rd | CP# | CP | 1 | CRm |
| Cond | 1111 | ignored by processor | | | | | |

Fig. 7

| 15 | 14 | 13 | 12 | 11 | 10 | | 8 | 7 | | 5 | 4 | 3 | 2 | | 0 |
|---|---|---|---|---|---|---|---|---|---|---|---|---|---|---|---|
| 0 | 0 | 0 | 00 | | Rd ||| Rs ||| 0 | OP | Immediate |||
| 0 | 0 | 0 | 00 | | Rd ||| Rs ||| 1 | OP | Register |||
| 0 | 0 | 0 | OP=1-3 || Rd ||| Immediate |||||||
| 0 | 0 | 0 | OP=0-2 || Rd ||| Rs ||| Immediate |||||
| 0 | 0 | 1 | 1 | 1 | OP1 ||| Rd/Rs1 ||| OP2 || Rs2 |||
| 0 | 1 | 0 | OP || Rd/Rs ||| Immediate |||||||
| 0 | 1 | 0 | 1 | 1 | Rd ||| PC Relative Offset |||||||
| 0 | 1 | 1 | B | L | Rd/Rs ||| SP Relative Offset |||||||
| 1 | 0 | 0 | 0 | L | Rn ||| Rd/Rs ||| B | U | Immediate |||
| 1 | 0 | 0 | 1 | L | Rn ||| Rd/Rs ||| B | U | Register |||
| 1 | 0 | 1 | B | L | Rn ||| Rd/Rs ||| Immediate ||||
| 1 | 1 | 0 | 0 | L | Rn ||| Register List |||||||
| 1 | 1 | 0 | 1 | SP | Rd ||| Effective Address Offset |||||||
| 1 | 1 | 1 | 0 | | Cond ||| 8 Bit Branch Office |||||||
| 1 | 1 | 1 | 1 | 0 | Long Branch and Link Segment ||||||||||
| 1 | 1 | 1 | 1 | 1 | Long Branch and Link Offset ||||||||||

*Fig.8*

| Thumb Register | ARM Register |
|---|---|
| General Register 0 | General Register 0 |
| General Register 1 | General Register 1 |
| General Register 2 | General Register 2 |
| General Register 3 | General Register 3 |
| General Register 4 | General Register 4 |
| General Register 5 | General Register 5 |
| General Register 6 | General Register 6 |
| General Register 7 | General Register 7 |
|  | General Register 8 |
|  | General Register 9 |
| Stack Limit | General Register 10 |
|  | General Register 11 |
|  | General Register 12 |
| Stack Pointer | Stack Pointer (R13) |
| Link Register | Link Register (R14) |
| Program Counter | Program Counter (R15) |
| CPSR | CPSR |
| SPSR | SPSR |

Fig.9

DATA PROCESSING WITH MULTIPLE INSTRUCTION SETS

RELATED APPLICATIONS

This is a continuation of application Ser. No. 08/308,836, filed on Sep. 19, 1994 now abandoned.

BACKGROUND OF THE INVENTION

1. Field of the Invention

This invention relates to the field of data processing. More particularly, this invention relates to data processing utilizing multiple sets of program instruction words.

2. Description of the Prior Art

Data processing systems utilize a processor core operating under control of program instruction words, which when decoded serve to generate control signals to control the different elements within the processor core to perform the necessary functions to achieve the processing specified in the program instruction word.

A typical processor core will have data pathways of a given bit width that limit the length of the data words that can be manipulated in response to a given instruction. The trend in the field of data processing has been for a steady increase in these data pathway widths, e.g. a gradual move from 8-bit architectures to 16-bit, 32-bit and 64-bit architectures. At the same time as this increase in data pathway width, the instruction sets have increased in the number of instructions possible (in both the CISC and RISC philosophies) and the bit length of those instructions. As an example, there has been a move from the use of 16-bit architectures with 16-bit instruction sets to the use of 32-bit architectures with 32-bit instruction sets.

A problem with migration towards increased architecture widths is the desire to maintain backward compatibility with program software written for preceding generations of machines. One way of addressing this has been to provide the new system with a compatibility mode. For example, the VAX11 computers of Digital Equipment Corporation have a compatibility mode that enables them to decode the instructions for the earlier PDP11 computers. Whilst this allows the earlier program software to be used, such use is not taking full advantage of the increased capabilities of the new processing system upon which it is running, e.g. perhaps only multiple stage 16-bit arithmetic is being used when the system in fact has the hardware to support 32-bit arithmetic.

Another problem associated with such changes in architecture width is that the size of computer programs using the new increased bit width instruction sets tends to increase (a 32-bit program instruction word occupies twice the storage space of a 16-bit program instruction word). Whilst this increase in size is to some extent offset by a single instruction being made to specify an operation that might previously have needed more than one of the shorter instructions, the tend is still for increased program size.

An approach to dealing with this problem is to allow a user to effectively specify their own instruction set. The IBM370 computers made by International Business Machines Corporation incorporate a writable control store using which a user may set up their own individual instruction set mapping instruction program words to desired actions by the different portions of the processor core. Whilst this approach gives good flexibility, it is difficult to produces high speed operation and the writable control store occupies a disadvantageously large area of an integrated circuit. Furthermore, the design of an efficient bespoke instruction set is a burdensome task for a user.

It is also known to provide systems in which a single instruction set has program instruction words of differing lengths. An example of this approach is the 6502 microprocessor produced by MOS Technology. This processor uses 8-bit operation codes that are followed by a variable number of operand bytes. The operation code has first to be decoded before the operands can be identified and the instruction effected. This requires multiple memory fetches and represents a significant constraint on system performance compared with program instructions words (i.e. operation code and any operands) of a constant known length.

SUMMARY OF THE INVENTION

An object of the invention is to address the abovementioned problems.

Viewed from one aspect the invention provides apparatus for processing data, said apparatus comprising:

(i) a processor core having N-bit data pathways and being responsive to a plurality of core control signals;

(ii) first decoding means for decoding X-bit program instruction words from a first permanent instruction set to generate said core control signals to trigger processing utilizing said N-bit data pathways;

(iii) second decoding means for decoding Y-bit program instruction words from a second permanent instruction set to generate said core control signals to trigger processing utilizing said N-bit data pathways, Y being less than X; and (iv) an instruction set switch for selecting either a first processing mode using said first decoding means upon received program instruction words or a second processing mode using said second decoding means upon received program instruction words.

The invention recognises that in a system having a wide standard X-bit instruction set and N-bit data pathways (e.g. a 32-bit instruction set operating on 32-bit data pathways), the full capabilities of the X-bit instruction set are often not used in normal programming. An example of this would be a 32-bit branch instruction. This branch instruction might have a 32 megabyte range that would only very occasionally be used. Thus, in most cases the branch would only be for a few instructions and most of the bits within the 32-bit instruction would be carrying no information. Many programs written using the 32-bit instruction set would have a low code density and utilize more program storage space than necessary.

The invention addresses this problem by providing a separate permanent Y-bit instruction set, where Y is less than X, that still operates on the full N-bit data pathways. Thus, the performance of the N-bit data pathways is utilized whilst code density is increased for those applications not requiring the sophistication of the X-bit instruction set.

There is a synergy in the provision of the two permanent instruction sets. The user is allowed the flexibility to alter the instruction set they are using to suit the circumstances of the program, with both instruction sets being efficiently implemented by the manufacturer (critical in high performance systems such as RISC processors where relative timings are critical) and without sacrificing the use of the N-bit data pathways.

Another advantage of this arrangement is that since fewer bytes of program code will be run per unit time when operating with the Y-bit instruction set, less stringent demands are place upon the data transfer capabilities of the memory systems storing the program code. This reduces complexity and cost.

The invention also moves in the opposite direction to the usual trend in the field. The trend is that with each new generation of processors, more instructions are added to the instructions sets with the instruction sets becoming wider to accommodate this. In contrast, the invention starts with a wide sophisticated instruction set and then adds a further narrower instruction set (with less space for large numbers of instructions) for use in situations where the full scope of the wide instruction set is not required.

It will be appreciated that the first instruction set and the second instruction set may be completely dependent. However, in preferred embodiments of the invention said second instruction set provides a subset of operations provided by said first instruction set.

Providing that the second instruction set is a sub-set of the first instruction set enables more efficient operation since the hardware elements of the processor core may be set out more readily to suit both instruction sets.

When an instruction set of program instruction words of an increased bit length has been added to an existing program instruction set, it is possible to ensure that the program instruction words from the two instruction sets are orthogonal. However, the instruction set switch allows this constraint to be avoided and permits systems in which said second instruction set is non-orthogonal to said first instruction set.

The freedom to use non-orthogonal instruction sets eases the task of the system designer and enables other aspects of the instruction set design to be more effectively handled.

The instruction set switch could be a hardware type switch set by some manual intervention. However, in preferred embodiments of the invention said instruction set switch comprises means responsive to an instruction set flag, said instruction set flag being setable under user program control.

Enabling the instruction set switch to be used to switch between the first instruction set and the second instruction set under software control is a considerable advantage. For example, a programmer may utilise the second instruction set with its Y-bit program instruction words for reasons of increased code density for the majority of a program and temporarily switch to the first instruction set with its X-bit program instruction words for those small portions of the program requiring the increased power and sophistication of the first instruction set.

The support of two independent instruction sets may introduce additional complication into the system. In preferred embodiments of the invention said processor core comprises a program status register for storing currently applicable processing status data and a saved program status register, said saved program status register being utilized to store processing status data associated with a main program when a program exception occurs causing execution of an exception handling program, said instruction set flag being part of said processing status data.

Providing the instruction set flag as part of the programming status data ensures that it is saved when an exception occurs. In this way, a single exception handler can handle exceptions from both processing modes and can be allowed access to the saved instruction set flag within the saved program status register should this be significant in handling the exception. Furthermore, the exception handler can be made to use either instruction set to improve either its speed or code density as the design constraints require.

In order to deal with the differing bit lengths of the different instruction sets, preferred embodiments of the invention provide that said processor core comprises a program counter register and a program counter incrementer for incrementing a program counter value stored within said program counter register to point to a next program instruction word, said program counter incrementer applying a different increment step in said first processing mode than in said second processing mode.

It will be appreciated that the shorter program instruction words of the second instruction set cannot contain as much information as those of the first instruction set. In order to accommodate this it is preferred that the spaces saved within the second instruction set by reducing the operand range that may be specified within a program instruction word.

In preferred embodiments of the invention said processor core is coupled to a memory system by a Y-bit data bus, such that program instruction words from said second instruction set require a single fetch cycle and program instruction words from said first instruction set require a plurality of fetch cycles.

The use of a Y-bit data bus and memory system allows a less expensive total system to be built whilst still enabling a single fetch cycle for each program instruction word for at least the second instruction set.

The first decoding means and the second decoding means may be completely separate. However, in preferred embodiments of the invention said second decoding means reuses at least a part of said first decoding means.

The re-use of at least part of the first decoding means by the second decoding means reduces the overall circuit area. Furthermore, since the first instruction set is generally less complicated then the second instruction set and is driving the same processor core, there will be a considerable amount of the second decoding means that it is possible to re-use.

Viewed from another aspect the invention provides a method of processing data, said method comprising the steps of:

(i) selecting either a first processing mode or a second processing mode for a processor core having N-bit data pathways and being responsive to a plurality of core control signals;

(ii) in said first processing mode, decoding X-bit program instruction words from a first permanent instruction set to generate said core control signals to trigger processing utilizing said N-bit data pathways; and (iii) in said second processing mode, decoding Y-bit program instruction words from a second permanent instruction set to generate said core control signals to trigger processing utilizing said N-bit data pathways, Y being less than X.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 illustrates an X-bit instruction set;

FIG. 8 illustrates a Y-bit instruction set; and

FIG. 9 illustrates the processing registers available to the first instruction set and the second instruction set.

DESCRIPTION OF THE PREFERRED EMBODIMENTS

Figure 1:
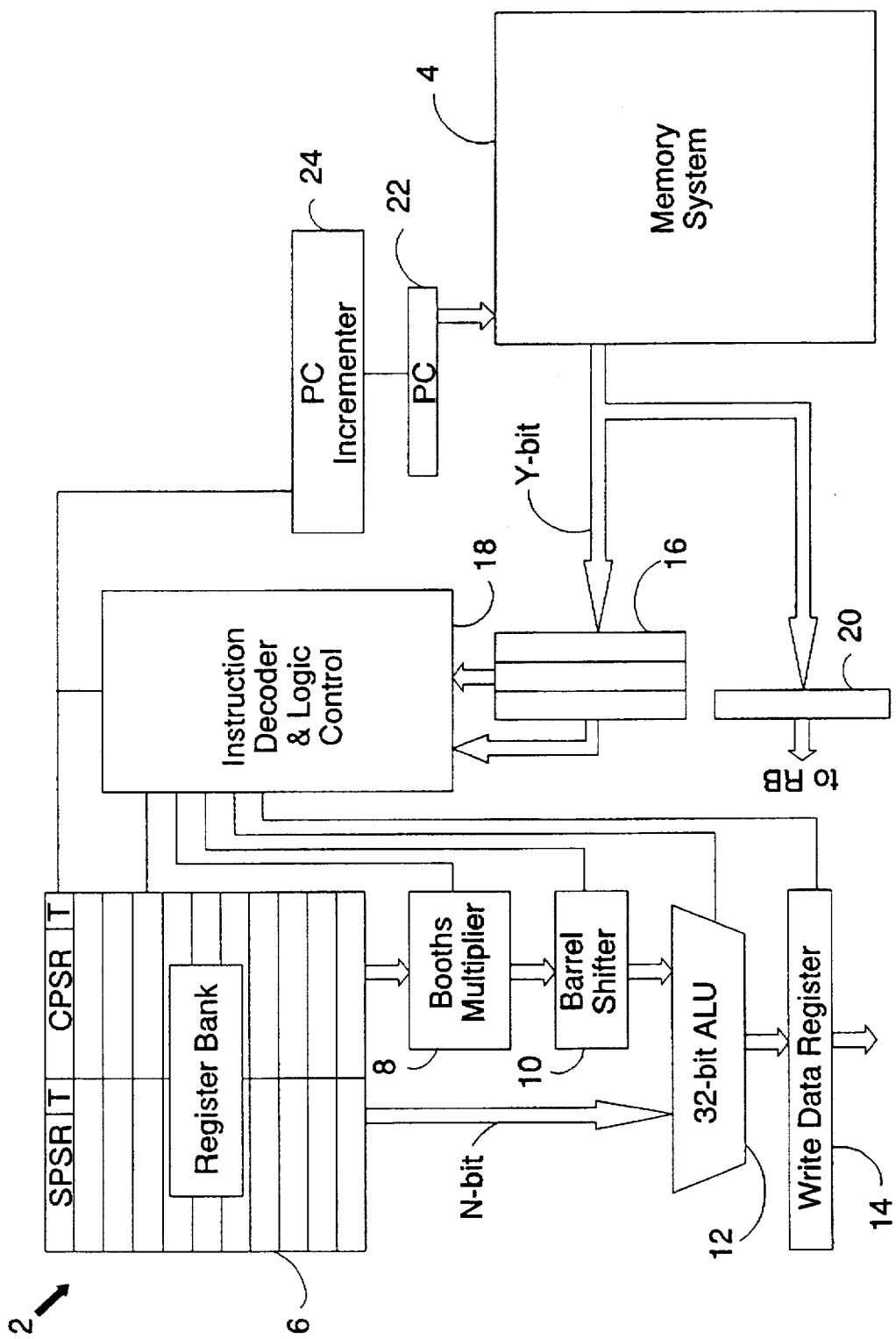
FIG. 1 schematically illustrates a data processing apparatus incorporating processor core and a memory system.

FIG. 1 illustrates a data processing system (that is formed as part of an integrated circuit) comprising a processor core 2 coupled to a Y-bit memory system 4. In this case, Y is equal to 16.

The processor core 2 includes a register bank 6, a Booths multiplier 8, a barrel shifter 10, a 32-bit arithmetic logic unit 12 and a write data register 14. Interposed between the processor core 2 and the memory system 4 is an instruction pipeline 16, an instruction decoder 18 and a read data register 20. A program counter register 22, which is part of the processor core 2, is shown addressing the memory system 4. A program counter incrementer 24 serves to increment the program counter value within the program counter register 22 as each instruction is executed and a new instruction must be fetched for the instruction pipeline 16.

The processor core 2 incorporates N-bit data pathways (in this case 32-bit data pathways) between the various functional units. In operation, instructions within the instruction pipeline 16 are decoded by the instruction decoder 18 which produces various core control signals that are passed to the different functional elements within the processor core 2. In response to these core control signals, the different portions of the processor core conduct 32-bit processing operations, such as 32-bit multiplication, 32-bit addition and 32-bit logical operations.

The register bank 6 includes a current programming status register 26 and a saved programming status register 28. The current programming status register 26 holds various condition and status flags for the processor core 2. These flags may include processing mode flags (e.g. system mode, user mode, memory abort mode etc.) as well as flags indicating the occurrence of zero results in arithmetic operations, carries and the like. The saved programming status register 28 (which may be one of a banked plurality of such saved programming status registers) is used to temporarily store the contents of the current programming status register 26 if an exception occurs that triggers a processing mode switch. In this way, exception handling can be made faster and more efficient.

Included within the current programming status register 26 is an instruction set flag T. This instruction set flag is supplied to the instruction decoder 18 and the program counter incrementer 24. When this instruction set flag T is set, the system operates with the instructions of the second instruction set (i.e. Y-bit program instruction words, in this case 16-bit program instruction words). The instruction set flag T controls the program counter incrementer 24 to adopt a smaller increment step when operated with the second instruction set. This is consistent with the program instruction words of the second instruction set being smaller and so more closely spaced within the memory locations of the memory system 4.

As previously mentioned, the memory system 4 is a 16-bit memory system connected via 16-bit data buses to the read data register 20 and the instruction pipeline 16. Such 16-bit memory systems are simpler and inexpensive relative to higher performance 32-bit memory systems. Using such a 16-bit memory system, 16-bit program instruction words can be fetched in a single cycle. However, if 32-bit instructions from the second instruction set are to be used (as indicated by the instruction set flag T), then two instruction fetches are required to recover a single 32-bit instruction for the instruction pipeline 16.

Once the required program instruction words have been recovered from the memory system 4, they are decoded by the instruction decoder 18 and initiate 32-bit processing within the processor core 2 irrespective of whether the instructions are 16-bit instructions or 32-bit instructions.

The instruction decoder 18 is illustrated in FIG. 1 as a single block. However, in order to deal with more than one instruction set, the instruction decoder 18 has a more complicated structure as will be discussed in relation to FIGS. 2 and 3.

Figure 2:
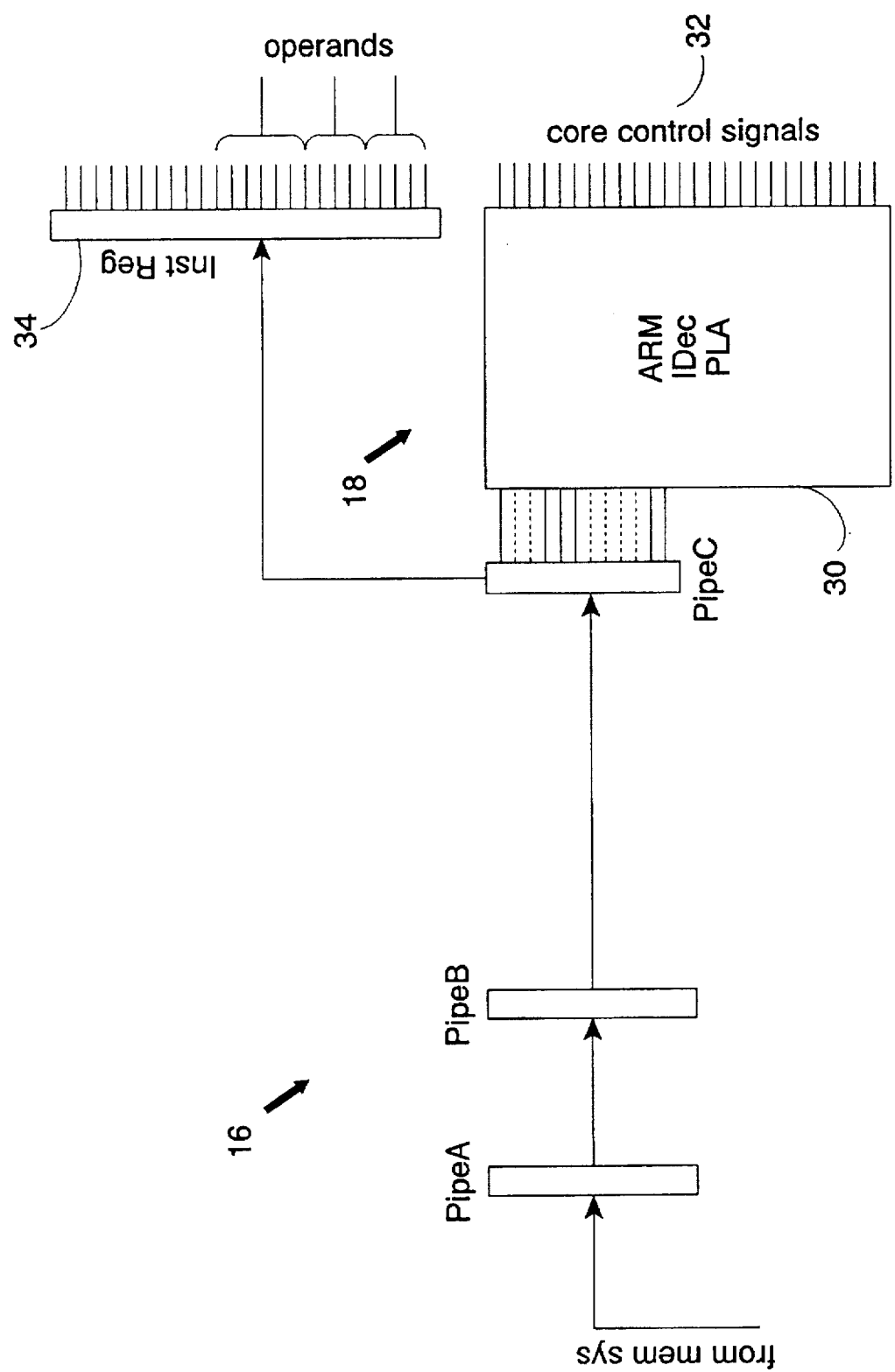
FIG. 2 schematically illustrates an instruction and instruction decoder for a system having a single instruction set.

FIG. 2 illustrates the instruction pipeline 16 and an instruction decoder 18 for coping with a single instruction set. In this case, the instruction decoder 18 includes only a first decoding means 30 that is operative to decode 32-bit instructions. This decoding means 30 decodes the first instruction set (the ARM instruction set) utilising a programmable logic array (PLA) to produce a plurality of core control signals 32 that are fed to the processor core 2. The program instruction word which is currently decoded (i.e. yields the current the core control signals 32) is also held within an instruction register 34. Functional elements within the processor core 2 (e.g. the Booths multiplier 8 or the register bank 6) read operands needed for their processing operation directly from this instruction register 34.

A feature of the operation of such an arrangement is that the first decoding means 30 requires certain of its inputs (the P bits shown as solid lines emerging from the PipeC pipeline stage) early in the clock cycle in which the first decoding means operates. This is to ensure that the core control signals 32 are generated in time to drive the necessary elements within the processor core 2. The first decoding means 30 is a relatively large and slow programmable logic array structure and so such timing considerations are important.

The design of such programmable logic array structures to perform instruction decoding is conventional within the art. A set of inputs are defined together with the desired outputs to be generated from those inputs. Commercially available software is then used to devise a PLA structure that will generate the specified set of outputs from the specified set of inputs.

Figure 3:
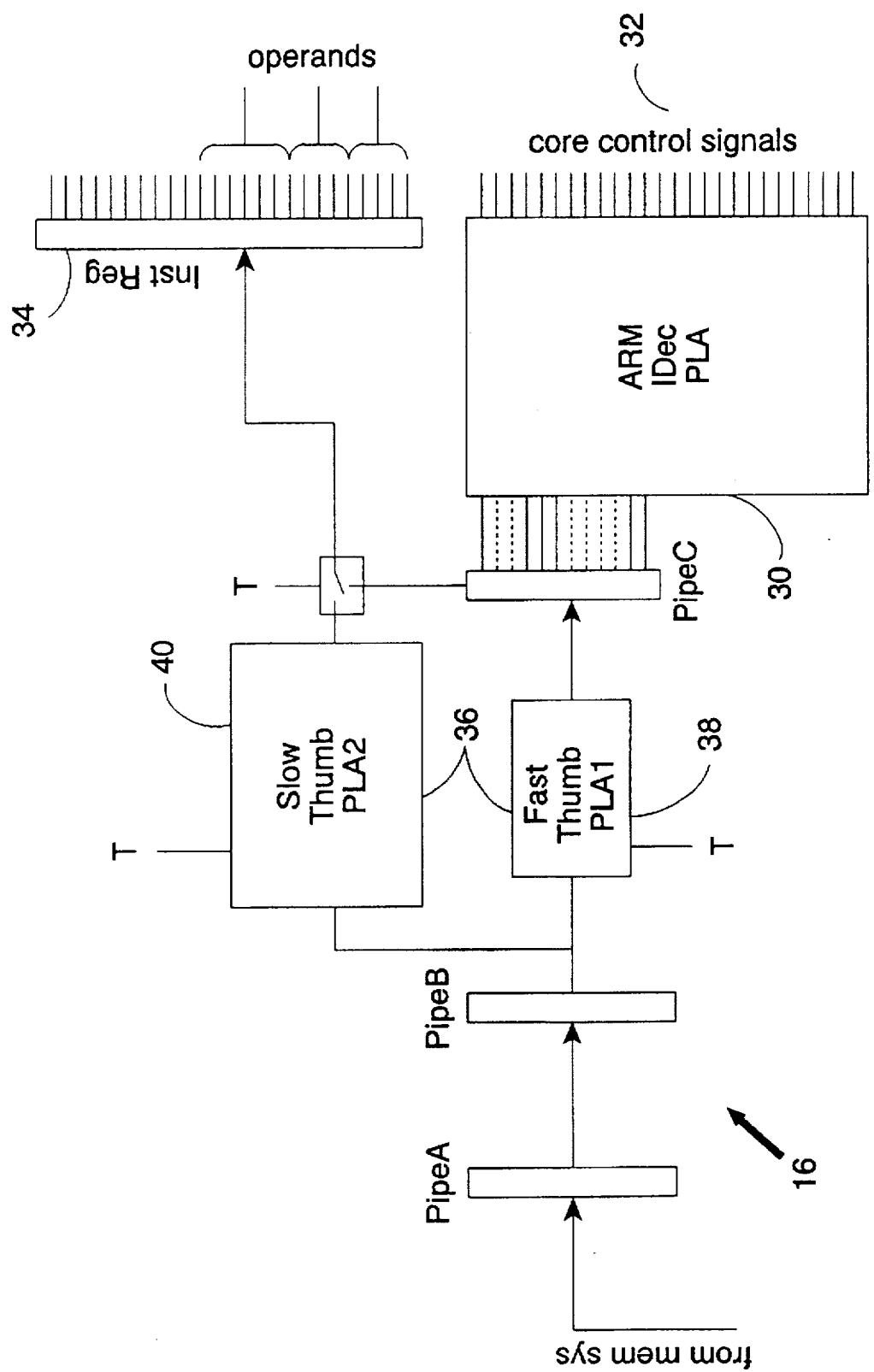
FIG. 3 illustrates an instruction pipeline and instruction decoders for use in a system having two instruction sets.

FIG. 3 illustrates the system of FIG. 2 modified to deal with decoding a first instruction set and a second instruction set. When the first instruction set is selected by the instruction set flag T, then the system operates as described in relation to FIG. 2. When the instruction set flag T indicates that the instructions in the instruction pipeline 16 are from the second instruction set, a second decoding means 36 becomes active.

This second decoding means decodes the 16-bit instructions (the Thumb instructions) utilising a fast PLA 38 and a parallel slow PLA 40. The fast PLA 38 serves to map a subset (Q bits) of the bits of the 16-bit Thumb instructions to the P bits of the corresponding 32-bit ARM instructions that are required to drive the first decoding means 30. Since a relatively small number of bits are required to undergo this mapping, the fast PLA 38 can be relatively shallow and so operate quickly enough to allow the first decoding means sufficient time to generate the core control signals 32 in response to the contents of PipeC. The fast PLA 38 can be considered to act to "fake" the critical bits of a corresponding 32-bit instruction for the first decoding means without spending any unnecessary time mapping the full instruction.

However, the full 32-bit instruction is still required by the processor core 2 if it is to be able to operate without radical alterations and significant additional circuit elements. With the time critical mapping having been taken care of by the fast PLA 38, the slow PLA 40 connected in parallel serves to map the 16-bit instruction to the corresponding 32-bit instruction and place this into the instruction register 34. This more complicated mapping may take place over the full time it takes the fast PLA 38 and the first decoding means 30 to operate. The important factor is that the 32-bit instruction should be present within the instruction register 34 in sufficient time for any operands to be read therefrom in response to the core control signals 32 acting upon the processor core 2.

It will be appreciated that the overall action of the system of FIG. 3 when decoding the second instruction set is to translate 16-bit instructions from the second instruction set to 32-bit instructions from the first instruction set as they progress along the instruction pipeline 16. This is rendered a practical possibility by making the second instruction set a subset of a first instruction set so as to ensure that there is a one to one mapping of instructions from the second instructions set into instructions within the first instruction set.

The provision of the instruction set flag T enables the second instruction set to be non-orthogonal to the first instruction set. This is particularly useful in circumstances where the first instruction set is an existing instruction set without any free bits that could be used to enable an orthogonal further instruction set to be detected and decoded.

Figure 4:
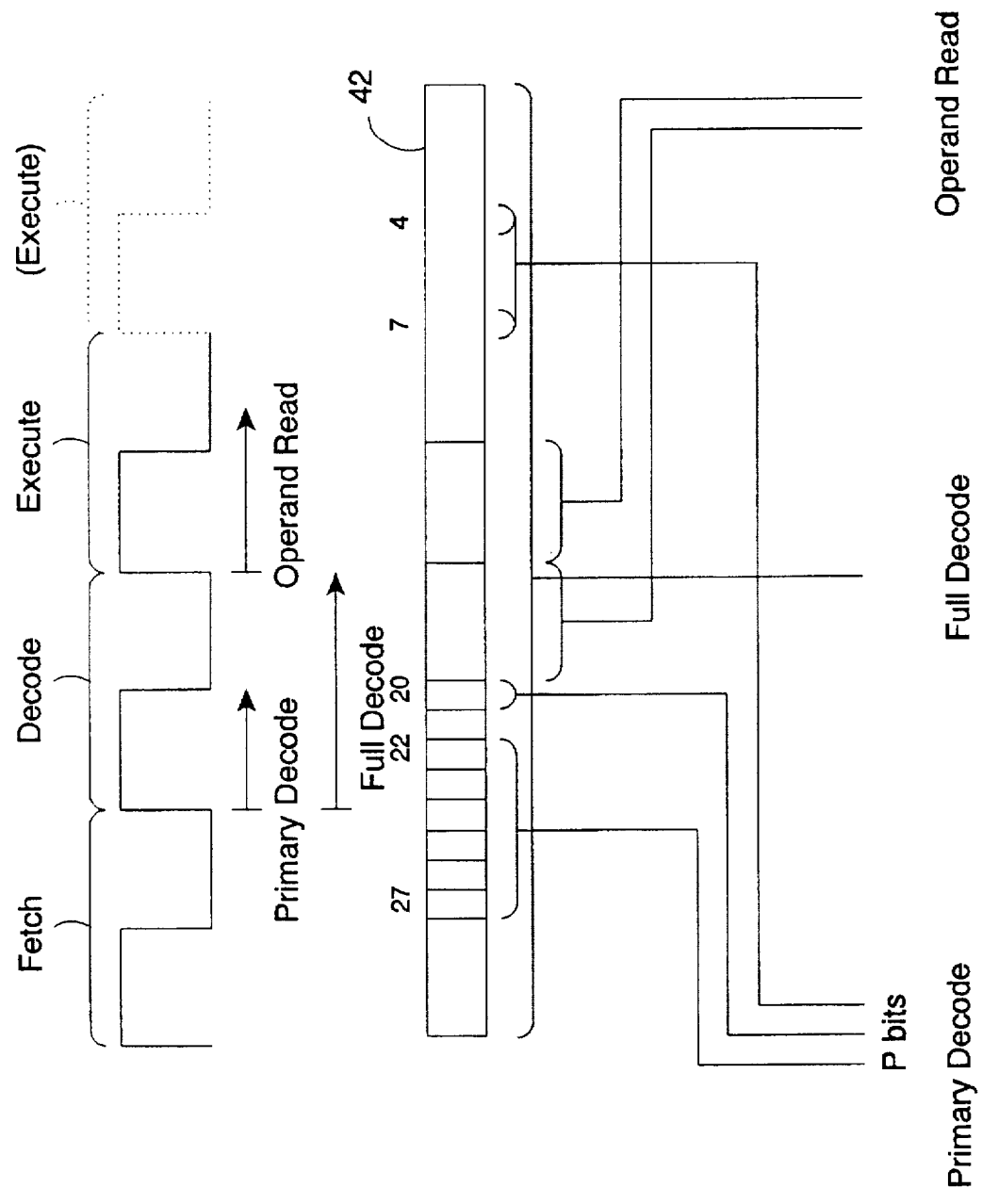
FIG. 4 illustrates the decoding of an X-bit program instruction word.

FIG. 4 illustrates the decoding of a 32-bit instruction. At the top of FIG. 4 successive processing clock cycles are illustrated in which a fetch operation, a decode operation and finally an execute operation performed. If the particular instruction so requires (e.g. a multiply instruction), then one or more additional execute cycles may be added.

A 32-bit instruction 42 is composed of a plurality of different fields. The boundaries between these fields will differ fop differing instructions as will be shown later in FIG. 7.

Some of the bits within the instruction 42 require decoding within a primary decode phase. These P bits are bits 4 to 7, 20 and 22 to 27. These are the bits that are required by the first decoding means 30 and that must be "faked" by the fast PLA 38. These bits must be applied to the first decoding means and decoded thereby to generate appropriate core control signals 32 by the end of the first part of the decode cycle. Decoding of the full instruction can, if necessary, take as long as the end of decode cycle. At the end of the decode cycle, operands within the instruction are read from the instruction register 34 by the processor 2 during the execute cycle. These operands may be register specifiers, offsets or other variables.

Figure 5:
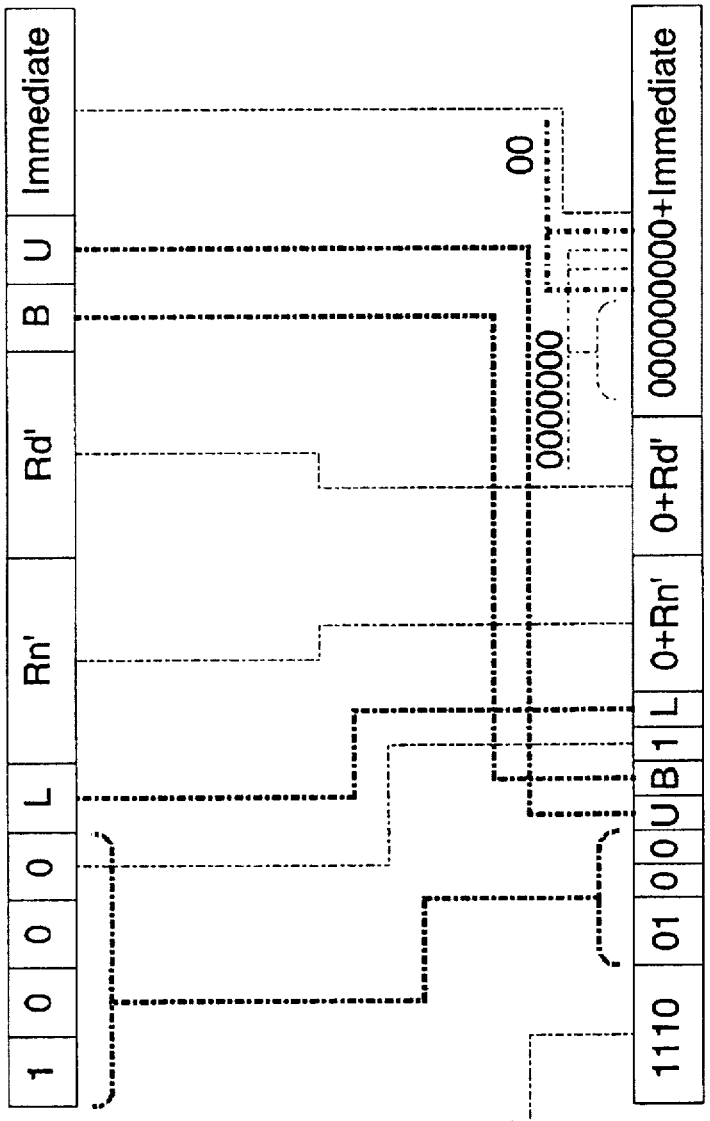
FIGS. 5 and 6 illustrate the mapping of Y-bit program instruction words to X-bit program instruction words.
Figure 5:
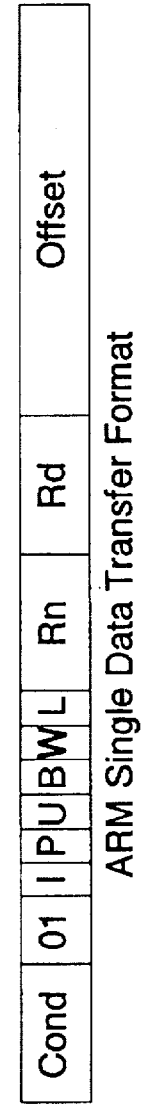

FIG. 5 shows the mapping of an example of 16-bit instruction to a 32-bit instruction. The thick lines originate from the Q bits within the 16-bit instruction that require mapping into the P bits within the 32-bit instruction so that they may be applied to the first decoding means 30. It will be seen that the majority of these bits are either copied straight across or involve a simple mapping. The operands Rn', Rd and Immediate within the 16-bit instruction require padding at their most significant end with zeros to fill the 32-bit instruction. This padding is needed as a result of the 32-bit instruction operands having a greater range than the 16-bit instruction operands.

It will be seen from the generalised form of the 32-bit instruction given at the bottom of FIG. 5, that the 32-bit instruction allows considerably more flexibility than the subset of that instruction that is represented by the 16-bit instruction. For example, the 32-bit instructions are preceded by condition codes Cond that renders the instruction conditionally executable. In contrast, the 16-bit instructions do not carry any condition codes in themselves and the condition codes of the 32-bit instructions to which they are mapped are set to a value of "1110" that is equivalent to the conditional execution state "always".

Figure 6:
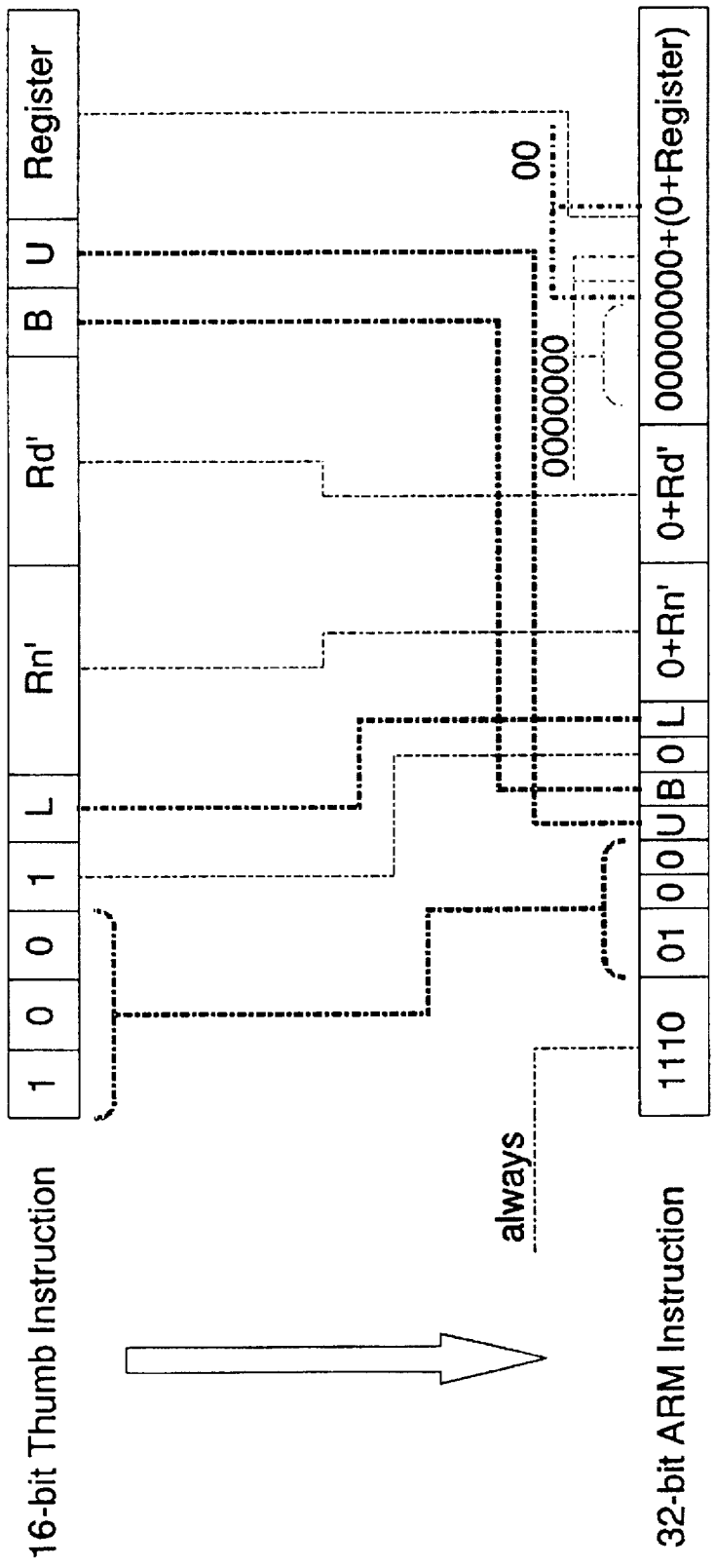

FIG. 6 illustrates another such instruction mapping. The 16-bit instruction in this case is a different type of Load/Store instruction to that illustrated in FIG. 5. However, this instruction is still a subset of the single data transfer instruction of the 32-bit instruction set.

FIG. 7 schematically illustrates the formats of the eleven different types of instruction for the 32-bit instruction set. These instructions are in turn:

1. Data processing PSR transfer;
2. Multiply;
3. Single data swap;
4. Single data transfer;
5. Undefined;
6. Block data transfer;
7. Branch;
8. Co-processor data transfer;
9. Co-processor data operation; and
10. Co-processor register transfer.
11. Software interrupt.

A full description of this instruction set may be found in the Data Sheet of the ARM6 processor produced by Advanced RISC Machines Limited. The instruction highlighted within FIG. 7 is that illustrated in FIGS. 5 and 6.

FIG. 8 illustrates the 16-bit instruction set that is provided in addition to the 32-bit instruction set. The instructions highlighted within this instruction set are those illustrated in FIGS. 5 and 6 respectively. The instructions within this 16-bit instruction set have been chosen such that they may all be mapped to a single 32-bit instruction and so form a subset of the 32-bit instruction set.

Passing in turn between each of the instructions in this instruction set, the formats specify the following:

| | |
|---|---|
| Format 1: | Op = 0, 1. Both ops set the condition code flags.<br>0: ADD Rd, Rs, #Immediate3<br>1: SUB Rd, Rs, #Immediate3 |
| Format 2: | Op = 0, 1. Both ops set the condition code flags.<br>0: ADD Rd, Rm, Rn<br>1: SUB Rd, Rm, Rn |
| Format 3: | 3 opcodes. Used to build large immediates.<br>1 = ADD Rd, Rd, #Immediate 8<<8<br>2 = ADD Rd, Rd, #Immediate 8<<16<br>3 = ADD Rd, Rd, #Immediate 8<<24 |
| Format 4: | Op gives 3 opcodes, all operations are MOVS Rd, Rs SHIFT<br>#Immediate5, where SHIFT is<br>0 is LSL<br>1 is LSR<br>2 is ASR<br>Shifts by zero as defined on ARM. |
| Format 5: | Op1*8 + Op2 gives 32 ALU opcodes, Rd = Rd op Rn. All operations set the condition code flags.<br>The operations are<br>AND, OR, EOR, BIC (AND NOT), NEGATE, CMP, CMN, MUL, TST, TEQ, MOV, MVN (NOT), LSL, LSR, ASR, ROR |

-continued

|  | Missing ADC, SBC, MULL |
|---|---|
|  | Shifts by zero and greater than 31 as defined on ARM |
|  | 8 special opcodes, LO specifies Reg 0–7, HI specifies a register 8–15 |
|  | SPECIAL is CPSR or SPSR |
|  | MOV    HI, LO (move hidden register to visible register) |
|  | MOV    LO, HI (move visible register to hidden register) |
|  | MOV    HI, HI (eg procedure return) |
|  | MOVS  HI, HI (eg exception return) |
|  | MOVS  HI, LO (eg interrupt return, could be SUBS, HI, HI, #4) |
|  | MOV    SPECIAL, LO (MSR) |
|  | MOV    LO, SPECIAL (MRS) |
|  | CMP    HI, HI (stack limit check) |
|  | 8 free opcodes |
| Format 6: | Op gives 4 opcodes. All operations set the condition code flags |
|  | 0: MOV Rd, #Immediate 8 |
|  | 1: CMP Rs, #Immediate 8 |
|  | 2: ADD Rd, Rd, #Immediate 8 |
|  | It is possible to trade ADD for ADD Rd, Rs, #Immediate5 |
| Format 7: | Loads a word PC + Offset (256 words, 1024 bytes). Note the offset must be word aligned. |
|  | LDR Rd, [PC, #+1024] |
|  | This instruction is used to access the next literal pool, to load constants, addresses etc. |
| Format 8: | Load and Store Word from SP (r7) + 256 words (1024 bytes) |
|  | Load and Store Byte from SP (r7) + 256 bytes |
|  | LRD Rd, [SP, #+1024] |
|  | LDRB Rd, [SP, #+256] |
|  | These instructions are for stack and frame access. |
| Format 9: | Load and Store Word (or Byte), signed 3 bit Immediate Offset (Post Inc/Dec), Forced Writeback |
|  | L is Load/Store, U is Up/Down (add/subtract offset), B is Byte/Word |
|  | LDR {B} Rd, [Rb], #+/−Offset3 |
|  | STR {B} Rd, [Rb], #+/−Offset3 |
|  | These instructions are intended for array access |
|  | The offset encodes 0–7 for bytes and 0, 4–28 for words |
| Format 10: | Load and Store Word (or Byte) with signed Register Offset (Pre Inc/Dec), No writeback |
|  | L is Load/Store, U is Up/Down (add/subtract offset), B is Byte/Word |
|  | LDR    Rd, [Rb, +/−Ro, LSL#2] |
|  | STR    Rd, [Rb, +/−Ro, LSL#2] |
|  | LDRB  Rd, [Rb, +/−Ro] |
|  | STRB  Rd, [Rb, +/−Ro] |
|  | These instructions are intended for base + offset pointer access, and combined with the 8-bit MOV, ADD, SUB give fairly quick immediate offset access. |
| Format 11: | Load and Store Word (or Byte) with signed 5 bit Immediate Offset (Pre Inc/Dec), No Writeback |
|  | L is Load/Store B is Byte/Word |
|  | LDR {B} Rd, [Rb, #+Offset5] |
|  | STR {B} Rd, [Rb, #+Offset5] |
|  | These instructions are intended for structure access |
|  | The offset encodes 0–31 for bytes and 0, 4–124 for words |
| Format 12: | Load and Store Multiple (Forced Writeback) |
|  | LDMIA Rb!, {Rlist} |
|  | STMIA Rb!, {Rlist} |
|  | Rlist specify registers r0–r7 |
|  | A sub-class of these instructions are a pair of subroutine call and return instructions. |
|  | For LDM if r7 is the base and bit 7 is set in rlist, the PC is loaded |
|  | For STM if r7 is the base and bit 7 is set in rlist, the LR is stored |
|  | If r7 is used as the base register, sp is used instead |
|  | In both cases a Full Descending Stack is implemented ie LDM is like ARM's LDMFD, STM is like ARM's STMFD |
|  | So for block copy, use r7 as the end pointer |
|  | If r7 is not the base, LDM and STM is like ARMs LDMIA, STMIA |
| Format 13: | Load address. This instruction adds an 8 bit unsigned constant to either the PC or the stack pointer and stores the results in the destination register. |
|  | ADD    Rd, sp, + 256 bytes |
|  | ADD    Rd, pc, + 256 words (1024 bytes) |
|  | The SP bit indicates if the SP or the PC is the source. |
|  | If SP is the source, and r7 is specified as the destination register, SP is used as the destination register. |
| Format 14: | Conditional branch, +/− 128 bytes, where cond defines the condition code (as on ARM) cond = 15 encodes as SWI (only 256, should be plenty). |
| Format 15: | Sets bits 22:12 of a long branch and link. MOV lr, #offset << 12. |
| Format 16: | Performs a long branch and link. Operation is SUB newlr, pc, #4; ORR pc, oldlr, #offset <<1. newlr and oldlr mean the lr register before and after the operation. |

As previously mentioned, the 16-bit instruction set has reduced operand ranges compared to the 32-bit instruction set. Commensurate with this, the 16-bit instruction set uses a subset of the registers 6 (see FIG. 1) that are provided for the full 32-bit instruction set. FIG. 9 illustrates the subset of registers that are used by the 16-bit instruction set.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Embedded apparatus for processing data, said embedded apparatus comprising:
   (i) a processor core having N-bit data path rays that receive a plurality of core control signals determined by either decoded X-bit program instruction words in a first permanent instruction set, or decoded Y-bit program instruction words in a second permanent instruction set, where Y is less than X, the second permanent instruction set corresponding to a subset of the first permanent instruction set and having subset elements of a type providing common functionality and higher code density with respect to said first permanent instruction set, the processor core adapted to perform N-bit data processing operations in response to the determined core control signals;
   (ii) a first decoder that is coupled to the N-bit data pathways of the processor core, and that receives selected X-bit program instruction words of the first permanent instruction set including all fixed length X-bit program instruction words specifying N-bit data processing operations, and decodes the X-bit instruction words to generate said core control signals to cause the processor core to perform the specified N-bit data processing operations using said N-bit data pathways;
   (iii) a second decoder that is coupled to the N-bit data pathways of the processor core, and that receives selected Y-bit program instruction words of the second permanent instruction set including all fixed length Y-bit program instruction words specifying N-bit data processing operations, and decodes the Y-bit instruction words to generate said core control signals to cause the N-bit data processing operations using said N-bit data pathways; and
   (iv) an instruction set switch coupled to said first decoder and to said second decoder for selecting either a first processing mode using said first decoder to decode received program instruction words or a second processing mode using said second decoder to decode said same received program instruction words, the instruction set switch being responsive to an instruction set flag, the instruction set flag being settable in real time under program control.

2. Apparatus as claimed in claim 1, wherein said second instruction set is non-orthogonal to said first instruction set.

3. Apparatus as claimed in claim 1, wherein said instruction set switch selects either said first processing mode or said second processing mode in response to an instruction set flag, said instruction set flag being setable under user program control.

4. Apparatus as claimed in claim 3, wherein said processor core comprises a program status register for storing currently applicable processing status data and a saved program status register, said saved program status register being utilized to store processing status data associated with a main program when a program exception occurs causing execution of an exception handling program, said instruction set flag being part of said processing status data.

5. Apparatus as claimed in claim 1 wherein said processor core comprises a program counter register and a program counter incrementer for incrementing a program counter value stored within said program counter register to point to a next program instruction word, said program counter incrementer incrementing said program counter value by a first increment step in said first processing mode; and by a second increment step in said second processing mode, said second increment step less than said first increment step.

6. Apparatus as claimed in claim 1, wherein at least one program instruction word within said second instruction set has a reduced operand range compared to a corresponding program instruction word within said first instruction set.

7. Apparatus as claimed in claim 1, further comprising:
(v) a memory system coupled to said processor core and to said first decoder and said second decoder by a Y-bit data pathway, and adapted to store and to provide to said decoders X-bit program instruction words of said first instruction set, and Y-bit program instruction words of said second instruction set, such that Y-bit program instruction words from said second instruction set require a single fetch cycle and X-bit program instruction words from said first instruction set require a plurality of fetch cycles.

8. Apparatus as claimed in claim 1, wherein said second decoder reuses at least a part of said first decoder.

9. Apparatus as claimed in claim 1, wherein said apparatus is an integrated circuit.

10. A method of processing data, said method comprising the steps of:
(i) selecting either a first processing mode or a second processing mode of an embedded processor core having N-bit data pathways that receive a plurality of core control signals determined by either decoded X-bit program instruction words in a first permanent instruction set or decoded Y-bit program instruction words in a second permanent instruction set, where Y is less than X, the second permanent instruction set corresponding to a subset of the first permanent instruction set and having subset elements of a type providing common functionality and higher code density with respect to said first permanent instruction set;
(ii) in said first processing mode, decoding received program instruction words as X-bit program instruction words from said first permanent instruction set including all fixed length X-bit program instruction words specifying N-bit data processing operations to generate core control signals, and providing said control signals to said processor core to cause said processor core to perform said specified N-bit data processing operations using said N-bit data pathways
(iii) in said second processing mode, decoding received program instruction words as Y-bit program instruction words from said second permanent instruction set including all fixed length Y-bit program instruction words specifying N-bit data processing operations to generate core control signals, and providing said control signals to said processor core to cause said processor core to perform said specified N-bit data processing operations using said N-bit data pathways; and
(iv) selecting, by an instruction set switch, either said first processing mode or said second processing mode, the instructions set switch being responsive to an instruction set flag, the instruction set flag being settable in real time under program control.

11. Apparatus as claimed in claim 1, wherein said second decoder decodes said Y-bit program instruction words by mapping a Y-bit program instruction word into a first X-bit program instruction word and providing said first X-bit program instruction word to said first decoder to decode said first X-bit program instruction word.

12. Apparatus as claimed in claim 1, wherein said second decoder comprises:
a first programmable logic array that receives a first subset of bits in a Y-bit program instruction word, maps said first subset of bits into a corresponding subset of bits in an X-bit program instruction word, and provides the corresponding subset of bits of said X-bit program instruction word to the first decoder for decoding into core control signals;
a second programmable logic array that receives said Y-bit program instruction word, and maps said Y-bit program instruction word to said corresponding X-bit instruction word, outputting said corresponding X-bit instruction word to an instruction register by a time said corresponding X-bit instruction word is read therefrom by said processor core in response to said core control signals.

13. The method of claim 10, further comprising:
storing a program counter value indicating a current program instruction word to be fetched;
in said first processing mode, incrementing said program counter value by a first increment step, and fetching an X-bit program instruction word in correspondence to said first increment step; and,
in said second processing mode, incrementing said program counter value by a second increment step, said second increment step being less than said first increment step, and fetching a Y-bit program instruction word in correspondence to said second increment step.

14. The method of claim 10, wherein the step (iii) comprises the substeps of:
mapping a Y-bit program instruction word into a first X-bit program instruction word; and,
decoding said first X-bit program instruction word to said first decoder to generate said core control signals therefrom.

15. The method of claim 10, wherein step (iii) comprises the substep of:
mapping a first subset of bits in a Y-bit program instruction word, maps said first subset of bits into a corresponding subset of bits in an X-bit program instruction word and decoding the corresponding subset of bits of said X-bit program instruction into core control signals; and, mapping said Y-bit program instruction word to said corresponding X-bit instruction word, and outputting said corresponding X-bit instruction word at a substantially same time as said corresponding X-bit instruction word is processed in response to said core control signals.

* * * * *